(12) United States Patent
Kenna

(10) Patent No.: US 8,371,791 B2
(45) Date of Patent: Feb. 12, 2013

(54) HAY AND SILAGE FEEDER

(76) Inventor: Gerard F. Kenna, The Sisters (AU)

( * ) Notice: Subject to any disclaimer, the term of this patent is extended or adjusted under 35 U.S.C. 154(b) by 178 days.

(21) Appl. No.: 12/309,116

(22) PCT Filed: Jul. 27, 2007

(86) PCT No.: PCT/AU2007/001040
§ 371 (c)(1),
(2), (4) Date: Jan. 27, 2009

(87) PCT Pub. No.: WO2008/011678
PCT Pub. Date: Jan. 31, 2008

(65) Prior Publication Data
US 2009/0162169 A1 Jun. 25, 2009

(30) Foreign Application Priority Data
Jul. 28, 2006 (AU) .............................. 2006904087

(51) Int. Cl.
*A01D 90/08* (2006.01)
*A01D 90/10* (2006.01)
*B65B 69/00* (2006.01)

(52) U.S. Cl. ........ 414/111; 414/521; 414/515; 198/746; 241/101.76; 241/605

(58) Field of Classification Search .................. 104/162; 198/692, 746, 749; 241/277, 280, 605; 414/111, 414/24.5, 24.6, 25, 395, 412, 501, 509, 515, 414/518, 521; 56/474; 83/909
See application file for complete search history.

(56) References Cited

U.S. PATENT DOCUMENTS

| | | | | |
|---|---|---|---|---|
| 3,353,692 A | * | 11/1967 | Ludwig | 414/360 |
| 3,656,638 A | * | 4/1972 | Hutton et al. | 414/518 |
| 3,942,666 A | * | 3/1976 | Pfremmer | 414/501 |

(Continued)

FOREIGN PATENT DOCUMENTS

| | | |
|---|---|---|
| AU | 198775023 | 1/1988 |
| AU | 199514957 A1 | 10/1995 |

(Continued)

OTHER PUBLICATIONS

Derwent Abstract No. 97-200506/18.
PCT International Search Report, PCT/AU2007/001040, dated Aug. 23, 2007.

*Primary Examiner* — Gregory Adams
(74) *Attorney, Agent, or Firm* — TraskBritt

(57) ABSTRACT

There is disclosed a feeding device (10) for dispensing bales of material from a vehicle. The feeding device (10) includes a body (12) having a surface for receiving a plurality of said bales thereon. The surface has a first end (12*a*) and a second end (12*b*) and is configured such that the plurality of bales are arranged in at least one row extending at least partially between the first and second ends (12*a*, 12*b*). A pusher (18) is slidably mounted to the surface and moveable between a first position proximal the first end (12*a*) and a second position proximal the second end (12*b*). A driving mechanism is provided and is controllable to move the pusher (18) between the first and second positions. Such movement of the pusher (18) from the first position to the second position applies a pushing force to the bales arranged in at least one row such that the bales in that row are progressively dispensed from said second end (12*b*) of the surface.

18 Claims, 7 Drawing Sheets

U.S. PATENT DOCUMENTS

| | | | |
|---|---|---|---|
| 4,111,318 A * | 9/1978 | Lutz | 414/521 |
| 4,117,940 A * | 10/1978 | Adam | 414/24.5 |
| 4,789,289 A * | 12/1988 | Wilson | 414/24.6 |
| 5,273,390 A * | 12/1993 | Crissman | 414/513 |
| 5,303,460 A * | 4/1994 | Neilsen et al. | 29/564.3 |
| 5,340,259 A * | 8/1994 | Flaskey | 414/24.5 |
| 5,700,124 A * | 12/1997 | Dufraisse | 414/111 |
| 5,997,233 A | 12/1999 | Whatley et al. | |
| 6,086,001 A * | 7/2000 | Patterson | 241/27 |
| 6,116,838 A | 9/2000 | Whatley et al. | |
| 6,695,560 B2 * | 2/2004 | Maclay | 414/111 |

FOREIGN PATENT DOCUMENTS

| | | | |
|---|---|---|---|
| AU | 679322 B | | 6/1997 |
| AU | 2004200730 | | 9/2004 |
| AU | 2004200730 A1 | | 9/2004 |
| CA | 1073218 A | * | 3/1980 |
| NZ | 244040 A | | 2/1996 |
| NZ | 250125 A | | 2/1996 |
| NZ | 511531 A | | 10/2002 |
| WO | WO 2008/011678 A1 | | 1/2008 |

* cited by examiner

HAY AND SILAGE FEEDER

CROSS-REFERENCE TO RELATED APPLICATIONS

The present application claims priority from Australian Provisional Patent Application No 200690487 filed on 28 Jul. 2006, the contents of which is incorporated herein by reference.

TECHNICAL FIELD OF THE INVENTION

The invention relates to a feeding device for feeding animals and livestock, and in particular, to a feeding device mountable to a vehicle that enables large numbers of stock to be fed in a single feeding run.

BACKGROUND TO THE INVENTION

Conventionally, feed for livestock such as hay, silage or other stock feed material is generally prepared and stored in the form of round or square/rectangular bales. Such bales are typically stored in fields for later feeding to the livestock to supplement their dietary intake.

Traditional methods of feeding such bales involve dispensing the bales on an individual basis. In this regard, the bales are typically manually loaded onto trucks and manually pushed off the truck at intervals to provide a number of feeding sites for the livestock to access and feed on the bales. Any breakage of the bales into smaller pieces is also typically done manually prior to unloading the bales from the truck. As the bales are often quite large and heavy, and tightly bound together with string, this can be very tiresome and labour intensive task, requiring a number of workers. Due to the manual nature of the task, there is much potential for causing physical damage to a person handling the bales.

A number of mechanically operated feeders have been proposed to assist in transporting and unloading bales from the feeder onto the ground for the livestock to feed on. Many of these devices involve various complicated mechanical structures that feed the bales by way of sliding or tilting movements of a variety of moving parts. The disadvantage with such feeders is that they are typically designed at unloading individual bales, and do not provide a device that is adapted to feed multiple bales to large numbers of livestock without having to make numerous trips to a supply to reload the device. In addition, where bales are bound together with string, there is no way for safely and automatically handling the string other than manually removing the string. The presence of loose pieces of string can result in the string becoming entangled in the machinery of the feeder as the bales are being unloaded. This can cause temporary or permanent failure of the feeding equipment/machinery resulting in an increase in cost and time to the farmer/primary producer.

Accordingly, there is a need to provide a hay and silage feeder that is able to feed large numbers of stock in a safe and reliable manner.

Any discussion of documents, acts, materials, devices, articles or the like which has been included in the present specification is solely for the purpose of providing a context for the present invention. It is not to be taken as an admission that any or all of these matters form part of the prior art base or were common general knowledge in the field relevant to the present invention as it existed before the priority date of each claim of this application.

SUMMARY OF THE INVENTION

According to a first aspect, there is provided a feeding device for dispensing bales of feed material from a vehicle, comprising:

a body having a surface for receiving a plurality of said bales thereon, said surface having a first end and a second end and being configured such that the plurality of bales are arranged in at least one row extending at least partially between said first and said second end;

a pusher slidably mounted to said surface and moveable between a first position proximal said first end of said surface and a second position proximal said second end of said surface; and a driving mechanism controllable to move said pusher between said first and second positions, wherein movement of the pusher from said first position to said second position applies a pushing force to the bales arranged in at least one row such that the bales in said row are progressively dispensed from said second end of the surface.

In one embodiment, each bale has one or more strings provided to retain the material together and a bale string removal member is provided to facilitate removal of the strings therefrom. The bale string removal member may extend adjacent the bales to facilitate connection of said one or more strings of each bale thereto, such that as the bales are progressively dispensed from said second end of the surface, the one or more strings are captured by the bale string removal member and removed from the bales. In one form, the bale string removal member may be a rope secured at one end to said body and positioned to extend over each bale in said line of bales to be dispensed. In another form, the bale string removal member may be a rope secured at one end to said pusher and positioned to extend over each bale in the line of bales to be dispensed.

In another embodiment, the surface of the body comprises at least one chute extending longitudinally between the first and second end of said surface for receiving the plurality of bales therein. The surface of the body may comprises a first and a second chute arranged parallel to each other such that the bales received therein form a first and second line of bales. The chutes may have one or more skids formed on the surface of the body to facilitate sliding of the bales within said chutes. The pusher may be mounted to the surface of the body between said first and second chutes. The pusher may include a pusher arm that extends laterally therefrom so as to extend across the first or second chute to impart said pushing force to said bales of the first or second chute to dispense said bales from the second end of the surface. The pusher arm may be pivotally attached to the pusher such that it can be positioned to extend across either the first or second chute when the pusher is in said first position.

The surface of the body may comprise a slide that extends from the first end of the body to a distance beyond the second end of the body and the pusher is mounted to said slide. The slide may include a channel member upon which the pusher is slidably mounted.

The driving mechanism may comprise at least one winch mounted to the vehicle to move the pusher between the first and second positions. The at least one winch may be attached to the pusher by one or more cables or chains such that operation of the winch winds one or more of the cables or chains onto the winch to impart motion to the pusher. The driving mechanism may comprise a first winch which moves the pusher from the first position to a second position, and a second winch which moves the pusher from the second position to the first position.

One or more spreaders may be attached to a second end of the surface to assist in dispensing the bales from the second end of the surface. The spreaders may comprise one or more rotatable drums having one or more radial spikes extending therefrom which contact the material of the bales to assist in removing the material therefrom. The rotatable drums may be mounted to said body adjacent the second end thereof.

In a second aspect the present invention provides a hay and silage feeder including:

a body portion having at least one parallel section for carrying at least one bale;

a pushing arm;

a driving assembly;

at least one winch;

and a bale string removal means whereby the hay and silage feeder provides a means for feeding a large number of stock.

It is preferred that each parallel section may have provided at least one skid which is adapted to assist the hay and/or silage bales being pushed, and sliding along the parallel sections from the front end of the platform to the rear end to be dispensed from the feeder.

It is preferred that the body portion of the feeder further comprises a slide which is adapted to assist a pushing arm to move forwardly and rearwardly along the body portion of the feeder in order to push the bale(s) from the feeder onto the ground.

It is preferred that the pushing arm may be preferably mounted onto a mounting member which is adapted to enable the pushing arm to slide within a vce portion of the slide of the feeder.

It is preferred that the driving mechanism includes a pulley, a chain or cable and at least one winch whereby, the pulley is preferably provided at the rear end of the feeder and is mounted in line with the slide of the feeder such that, the chain or cable from the winch can be pulled along the slide, around the pulley and back to the pushing arm in order to drive the movement of the pushing arm.

It is preferred that the feeder may further comprise a continuous rope which is adapted to be intertwined with the string of the bales in order to remove and retain the bale string on the feeder as the bales are being dispensed.

In order that the invention may be more readily understood we will describe by way of non-limiting example, a specific embodiment thereof.

In a further aspect, the present invention provides a method for dispensing bales of feed material from a vehicle comprising:

loading said bales onto a surface of the vehicle such that the bales are arranged in longitudinal rows along the surface of the vehicle;

positioning a pusher behind an endmost bale in said row of bales;

moving said pusher from a first position in a first direction such that said bales in said row are progressively dispensed from an end of the surface of the vehicle;

capturing string from said bales prior to said bales being dispensed; and returning said pusher in a second direction to said first position.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

BRIEF DESCRIPTION OF THE DRAWINGS

By way of example only, the invention is now described with reference to the accompanying drawings.

DETAILED DESCRIPTION OF THE INVENTION

The feeder device of the present invention will be described below in relation to its application for feeding bales of hay and silage from a vehicle for consumption by livestock. It will be appreciated that the feeder of the present invention could be equally applied to feeding and/or dispensing a variety of products from vehicles for mass consumption, including various forms of fodder and other foodstuff, whilst still falling within the spirit of the present invention.

Figure 1:
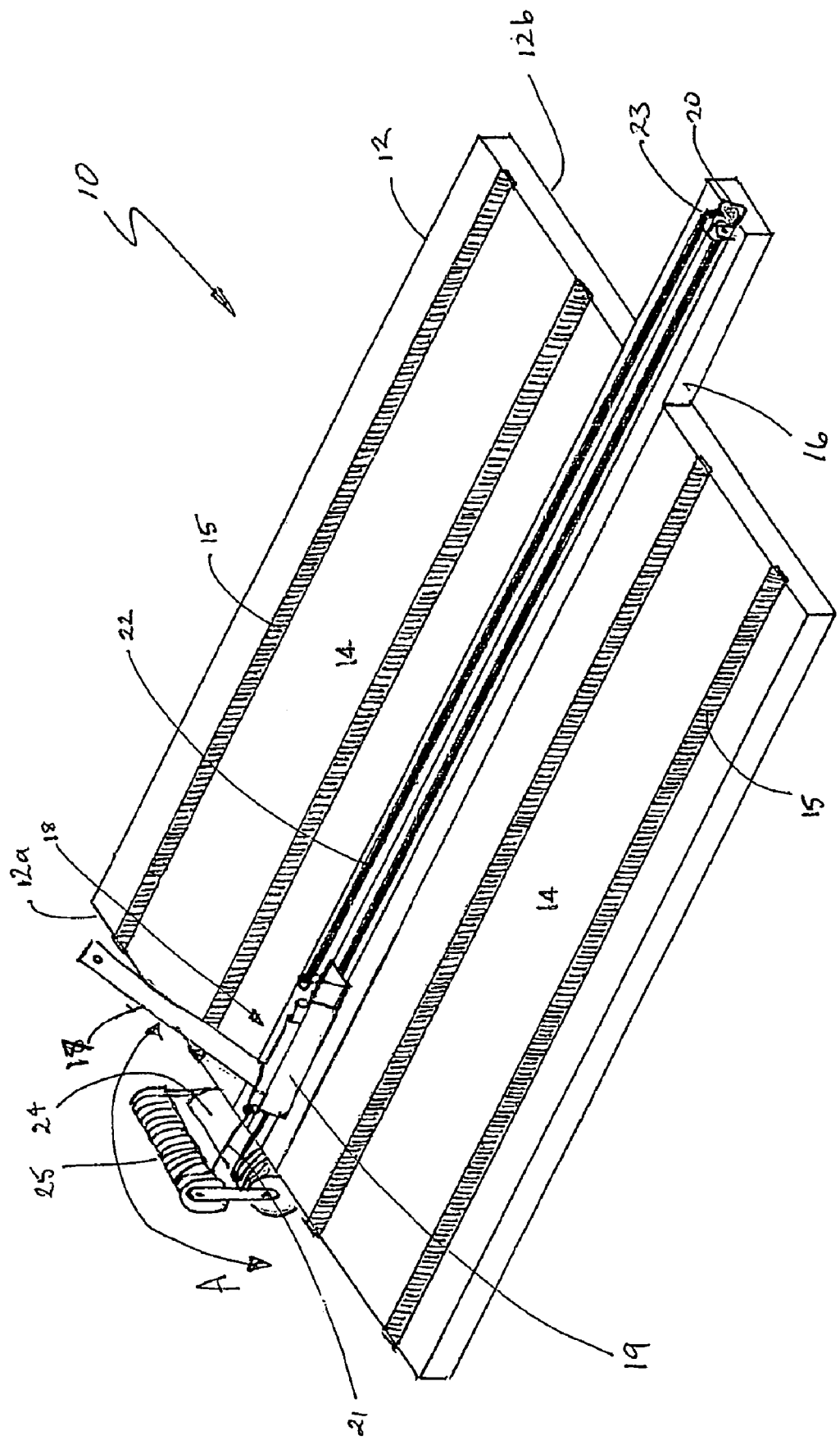
FIG. 1 is a perspective view of a feeding device in accordance with an embodiment of the present invention.

One embodiment of a hay and silage feeder 10 according to the present invention is shown in FIG. 1. The feeder 10 has a substantially planar body 12 in the form of a rectangular platform. The body disarranged to define a pair of loading sections or chutes 14 that extend longitudinally along a length of the body 12 from a front end 12a to a rear end 12b. Each chute 14 is configured to receive one or more bales of hay or silage arranged in a row along the length of the chute 14. The body 12 may vary in length depending upon the number of bales to be dispensed from the feeder 10. It will also be appreciated that the body 12 of the present invention could have one or more chutes 14 arranged in a variety of configurations along the surface of the body 12 and still fall within the spirit of the present invention.

To assist in dispensing the bales from each loading section 14, a pair of skids 15 are optionally provided. As shown in FIG. 1, the skids 15 extend the length of the chutes 14 and are located above the base of the body 12, to function as rails upon which the bales can slide as they are being pushed and dispensed from the chutes 14. The skids 15 are in the form of treated pine beams attached to the surface of the body 12, and which have a layer of sheet material affixed to a top surface thereof. The sheet material may be in the form of a smooth sheet metal, such as stainless steel, or a polycarbonate material, such as Polystone®, or any other suitable material. In such an arrangement, the skids 15 act to grip the bales as they slide along the surface of the body 12 such that the bales remain in position under the pushing force and can more freely slide along the surface of the chutes 14. As will be described below in relation to FIG. 4, the skids 15 may assume a variety of forms and may be in the form of a smooth, planar portion of sheet metal placed on the surface of the chutes 14. In these embodiments a lip or edge may be provided longitudinally along the surface to maintain the bales in position along the row and prevent bales from falling from the sides of the body 12 under action of the pushing force.

A slide 16 is located between each of the chutes 14. The slide 16 extends from a front end 12a of the body 12 to beyond the rear end 12b, and is arranged substantially parallel with the chutes 14. A pusher 18 is mounted to the slide 16 such that it can move along the length of the slide to push the bales from the chutes 14. The manner in which the pusher 18 is mounted to the slide 16 and functions to dispense the bales from the chutes 14 will be discussed in more detail below.

As shown in FIG. 1, the slide 16 is in the form of an open elongate channel 20. The elongate channel 20 has a V-shape and is mounted to the base of the body 12 such that the open V-portion of the channel 20 faces upwardly. In this arrangement, the channel is able to receive a chain or cable 22 positioned therein that extends the length of the slide.

The pusher 18 is mounted to the channel 20 of the slide 16 such mat it is free to slide along the channel 20. As shown more clearly in FIGS. 5 and 6, the pusher 18 has an arm 17 that extends laterally from a mount member 19 across a chute 14. The mount member 19 is also in the form of an open channel, such as a piece of steel, which fits over the channel 20 of the slide 16. To prevent lateral movement of the mount member 19 during use, a pair of extending lugs 19a project from the mount member along each edge to secure the mount member 19 to the channel 20. The lugs 19a act to stabilise the mount member 19 such that it is able to slide along the channel 20.

Figure 6:
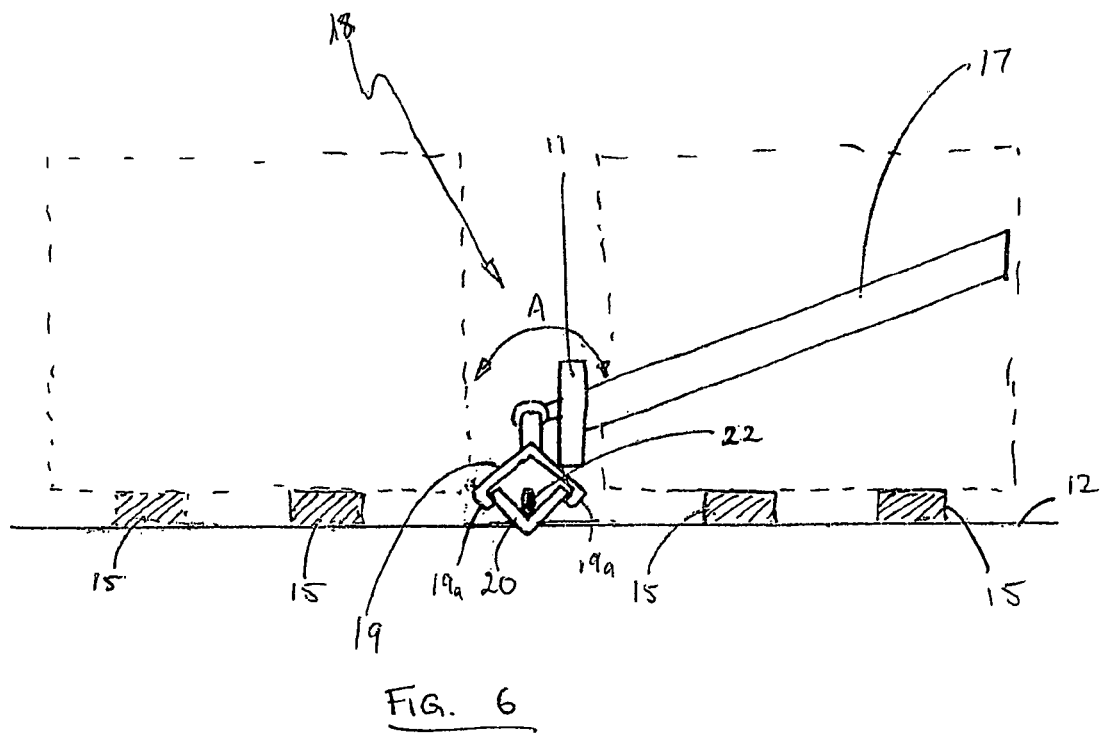
FIG. 6 is an end view of the pusher mechanism of FIG. 5.

As shown in FIG. 6, the pusher 18 is positioned such that the arm 17 extends behind the bale positioned on the chute 14 proximal the front end 12a of the body 12 (shown as dashed line). As the pusher 18 slides along the channel 20, the arm 17 provides a pushing force behind the bales to dispense the bales from the rear end 12b of the body 12.

Figure 5:
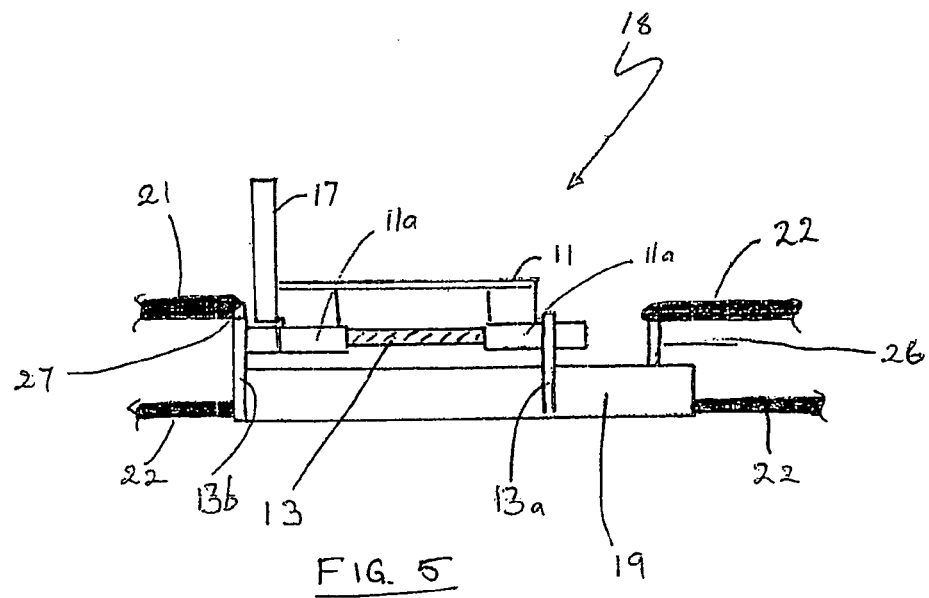
FIG. 5 is a side view of a pusher mechanism in accordance with an embodiment of the feeding device of the present invention.

As is shown in more detail in FIG. 5, arm 17 is pivotally mounted to the mount member 19 such that it can be pivoted in the direction of arrow A (FIGS. 1 and 6) to dispense bales from either of the chutes 14. To facilitate such pivotal movement, a shaft 13 is mounted to the mount member 19 between a pair of supports 13a, 13b. A pivot plate 11 is connected to the arm 17 and extends transversely from the arm 17, such that it is parallel to the mount member 19. The pivot plate 11 is mounted to the shaft 13 by way of sleeves 11a, such that the arm 17 and the plate 11 is able to pivot about the shaft 13 in the direction of arrow A to facilitate feeding from either of the chutes 14. In this regard, following completion of feeding of the bales in one of the chutes 14, the pusher 18 can be returned to a start/loading position adjacent the front end 12a of the body 12. The arm 17 and plate 11 can then be rotated in the direction of arrow A such that the arm extends behind the bales loaded in the adjacent chute 14, to facilitate feeding of the bales from that chute.

A drive arrangement facilitates sliding movement of the pusher 18 along the channel 20. In one embodiment, the drive arrangement includes the chain or cable 22 that extends within the channel 20 and which is connected to an end of the mount member 19 by way of link 26 (FIG. 5). A pulley 23 is located at the end of the slide 16, proximal the rear end 12b of the body 12, and the cable 22 passes over the pulley 23 to be connected to the mount member 19. The other end of the cable 22 is connected to a driving winch 24, or similar driving device, positioned adjacent the front end 12a of the body 12. When activated, the driving winch 24 winds the cable 22, thereby pulling the pusher 18 in a sliding motion along the channel 20 towards the rear end 12b of the body 12. This then results in the bales located in front of the arm 17 of the pusher being pushed off the rear end 12b of the body 12, as will be discussed in more detail below.

To enable the pusher 18 to be returned to a loading position proximal the front end 12a of the body 12, a return winch 25 is provided. The return winch 25 is mounted adjacent the front end 12a of the body 12 and is connected to a second link 27 of the mount member 19 by way of a second cable 21. Activation of the return winch 25 winds the second cable 21 thereby pulling the pusher 18 back to the loading position as shown in FIG. 1.

To control the feed-rate of the bales from the feeder 10, the speed of the driving winch 24 can be regulated. The speed of the driving winch may be regulated in relation to the speed of the vehicle upon which the feeder 10 is mounted, such that a constant feed rate of the bales is maintained. Similarly, as the act of returning the pusher 18 to the loading position does not require the arm 17 to push against a load, the return winch 25 can have a much smaller load rating than that required for the driving winch 24.

Figure 2:
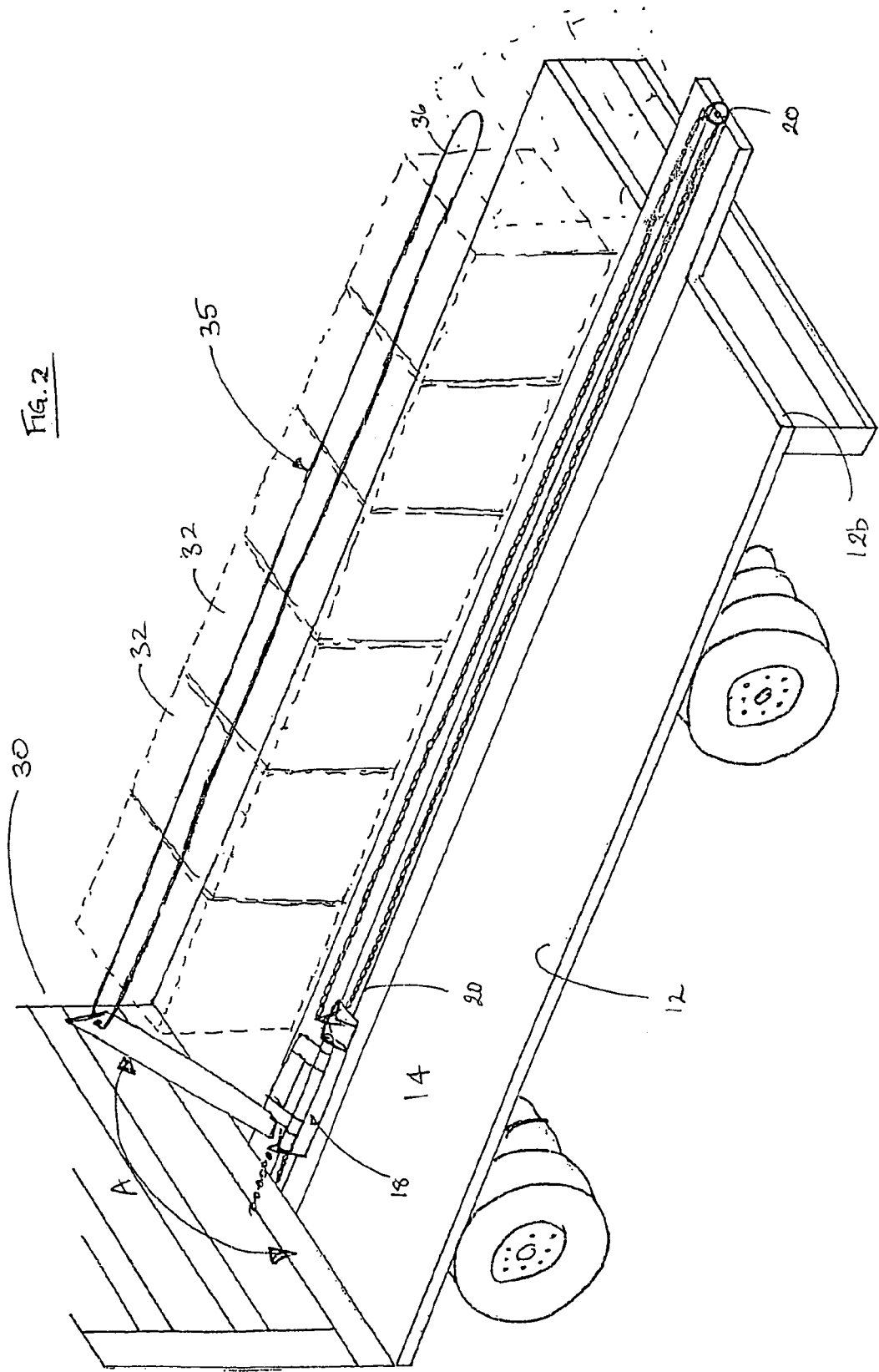
FIG. 2 is a perspective view of the feeding device of FIG. 1 provided on a tray of a truck or trailer.

As shown in FIG. 2, in one embodiment, the body 12 of the feeder 10 can be a tray or trailer of a truck 30 or incorporated into a tray or trailer of a truck 30. Similarly, the body 12 of the feeder 10 can be separately formed of a sheet material or other platform-like construction that could be temporarily or permanently attached to a tray or trailer of a truck. In such an application, the body 12 of the feeder 10 can have a length in excess of 16 feet (5 meters), which is useful for dispensing large amounts of feed to livestock. In the embodiment as shown in FIG. 2, only one of the chutes 14 is loaded with bales 32, however, it will be appreciated that, depending on feeding requirements, both chutes can be loaded with bales 32 for dispensing to stock.

In the embodiment as shown in FIG. 2, the drive arrangement may employ a single winch (not shown) mounted adjacent to the front end 12a of the truck 30. The winch may drive a sprocket that drives a continuous chain or cable to move the pusher 18 along the channel 20. Such an arrangement overcomes the need to provide an additional winch to return the pusher 18 to a loading position, as the operation of the winch can merely be reversed to perform this function. As will be appreciated, the drive arrangement of this embodiment, and of any of the other embodiments described herein, may comprise one or more cut-off switches and proximity sensors to control movement of the pusher 18. In this regard, the proximity sensors may determine that the pusher 18 is at or adjacent the rear end 12b of the body 12 and activate a cut-off switch that stops the drive mechanism. The pusher 18 can then return to its start/loading position adjacent the front end 12a of the body 12.

Figure 8:
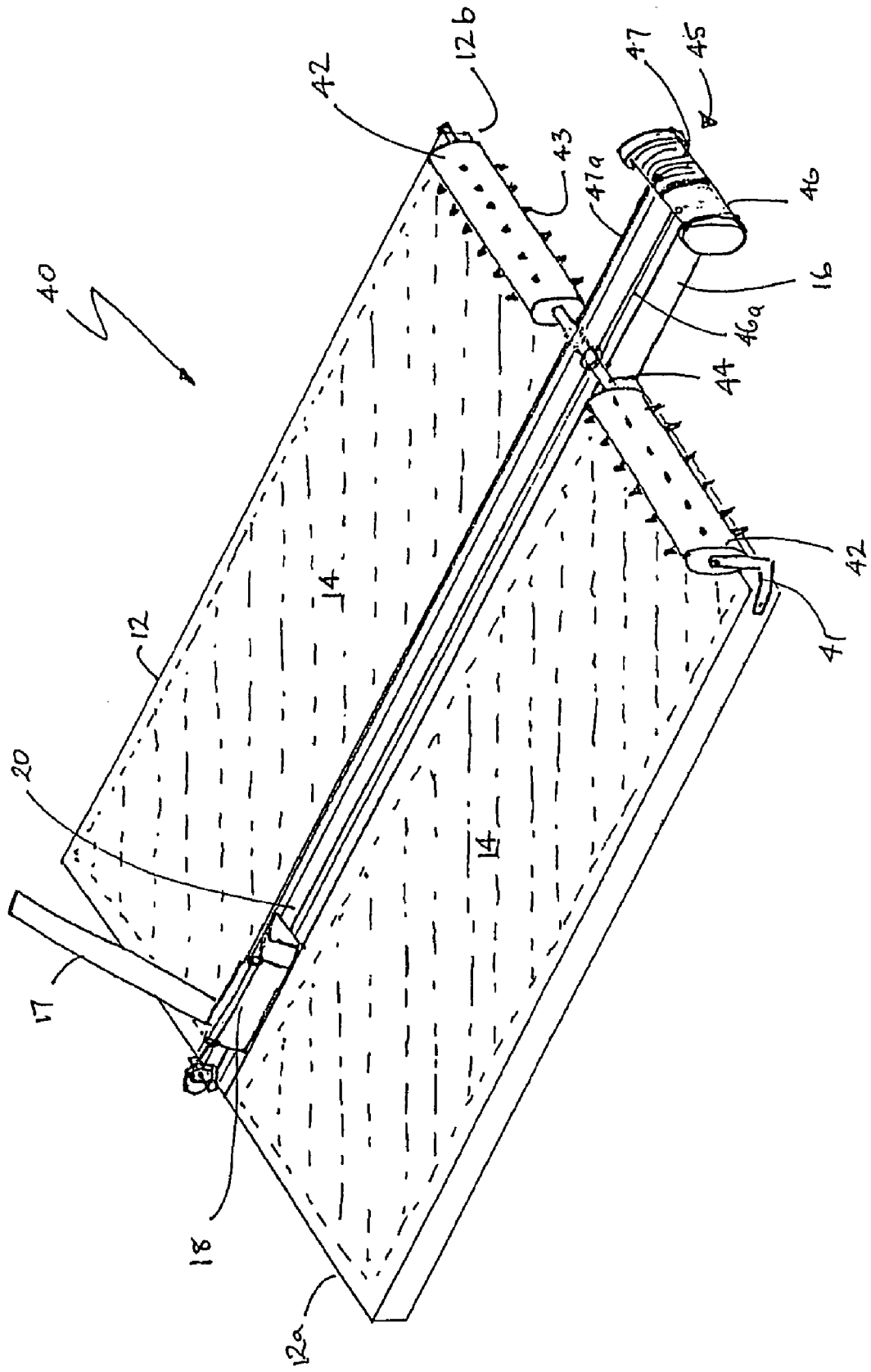
FIG. 8 is a perspective view of an alternative embodiment of a feeding device of the present invention.
Figure 9:
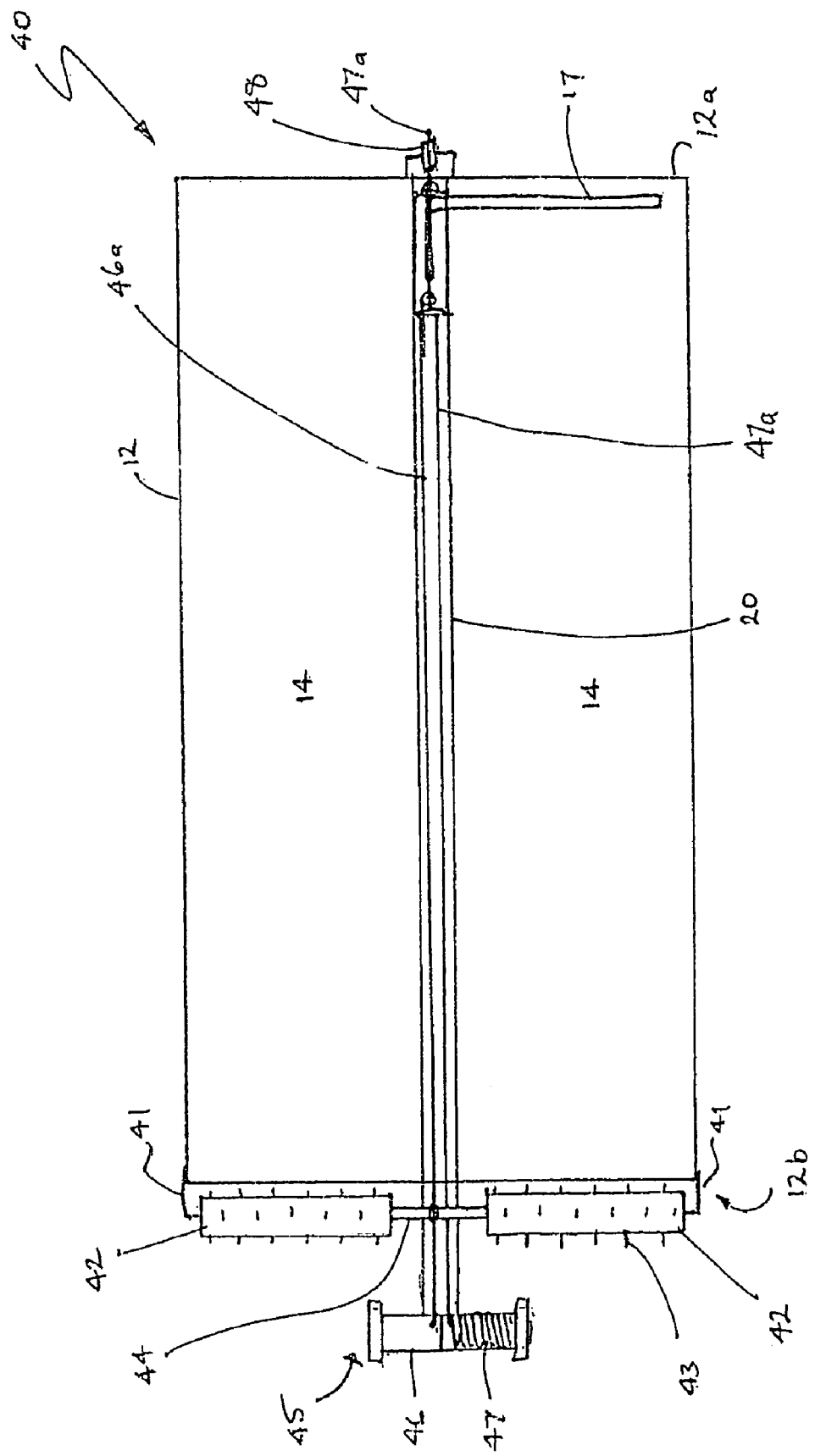
FIG. 9 is a top view of the feeding device of FIG. 8.

An alternative embodiment of a feeder 40 of the present invention is shown in FIGS. 8 and 9. The feeder 40 is similar to the feeder 10 as shown in FIGS. 1 and 2, and similar reference numerals will be used to refer to like features.

In this embodiment, feeder 40 has a body 12 adapted to be mounted to a vehicle for receiving bales of nay/silage for dispensing to livestock. A pusher 18 is mounted within a channel 20 and has an arm 17 extending therefrom for applying a pushing force to the bales positioned upon the surface of the body 12. In this embodiment, there are no skids 15 attached to the surface of the body 12. Rather, the surface of the body 12 is sufficiently smooth to facilitate sliding motion of the bales positioned thereon under pushing action of the arm 17. As such, the body 12 may be coated with a smooth layer of sheet steel or the like.

A pair of bale spreaders 42 are mounted to the rear end 12b of the body 12 such that they are located beyond the rear end 12b and extend above the surface of the body 12. The spreaders 42 are in the form of cylindrical drums having a plurality of spikes or prongs 43 extending radially therefrom. Each spreader 42 is mounted to the body 12 by way of mounts 41 so as to extend across the end of each chute 14. The spreaders 42 are connected by a common shaft 44 that extends therebetween and each spreader 42 is rotatable about a central axis defined by the common shaft 44.

The drive arrangement of the feeder 40 comprises a split winch 45 mounted to a distal end of the slide 16. The split winch 45 has two separate winding regions 46, 47 and is controllable to rotate in either a clockwise or anti-clockwise manner. A pair of cables 46a, 47a are attached at an end thereof to the winding regions 46, 47 respectively. The other end of the cables 46a, 47a are attached to opposing ends of the pusher 18 by way of appropriate links (not shown). As is more clearly shown in FIG. 9, cable 46a is attached to an end of the pusher 18 proximal the rear end 12b of the body 12. Cable 47a is received within the channel 20 and passes over a pulley 48 mounted to a front end 12a of the body 12, to be attached to the corresponding end of the pusher 18.

When the pusher 18 is in the start or loading position as shown in FIGS. 8 and 9, operation of the split winch 45 in a first direction causes the cable 46a to be wound onto the corresponding winding region 46 of the split winch 45. As the cable 46a is wound onto the winding region 46, the pusher 18 is pulled towards the rear end 12b of the body 12, thereby causing the bales in the chute 14 to move towards the spreaders 42. At the same time, the cable 47a is caused to unwind from winding region 47, ensuring a substantially constant tension in both the cables 46a, 47a.

As the pusher 18 is moved towards the rear end 12b of the body 12, the spreaders 42 are caused to rotate. As the bales are moved towards the rotating spreaders 42, the spikes or prongs 43 of the spreaders 42 contact the bales and cause the bales to break up/separate. The spikes 43 act to pull the hay/silage away from the tightly bound bale and through a gap provided between the rear end 12b of the body 12 and the spreaders 42. Such an arrangement provides a more even distribution of the hay/silage in a trail behind the vehicle as the vehicle moves along a field. As such, the livestock can readily access the feed along the length of the trail.

In one embodiment, the spreaders 42 may be rotated by a separate motor attached to the common shaft 44. In a preferred arrangement, as is shown more clearly in FIG. 9, the split winch 45 that drives the pusher 18 may also drive the spreaders 42. In this regard, the cable 46a is doubled around the common shaft 44 such that as the cable 46a is wound by the split winch 45, the common shaft 44 is caused to rotate. In this arrangement, the spikes 43 move at approximately twice the speed of the bales that are moving towards it ensuring that the bales are more evenly shredded by the spreaders 42.

At the completion of all the bales being dispensed from the chute 14, the split winch 45 is then operated in a reverse direction to that described above. This results in the cable 47a being wound on to the winding region 47, whilst the cable 46a unwinds from the winding region 46. The pusher 18 is then moved back to the start or loading position, as shown in FIG. 9.

Feeder 40 provides an alternative feeding device that utilises a single winch 45 to move the pusher in a reciprocal motion along the length of the body 12. It will be appreciated that the drive mechanism of feeder 40 could be used in the arrangement of the feeder device as shown in FIGS. 1 and 2, as could the provision of spreaders 42 to assist in feeding the hay/silage.

As the present invention is applicable to the dispensing of hay/silage stored in square or rectangular bales 32, one problem with such bales is the presence of string or twine around the bales to keep the raw material together in a manageable mass. Merely pushing the bales 32 from the body 12 without completely removing the string can result in uneven distribution of the hay or silage as the bales substantially remain intact due to the presence of the string. This results in the animals having restricted access to the raw material of the bales, resulting in the more dominant animals feeding on the bales and little to no feed being made available to less dominant animals.

Cutting and removing the string prior to dispensing the bales can overcome this problem and create a more evenly spread trail of feed behind the feeder. However, as the string will be delivered with the hay/silage, the string may be inadvertently consumed by the animal or become entangled with the animal or other machinery, such as spreaders and the like. This can cause health problems with the animals and can damage machinery.

As will be appreciated, in existing feeding systems, in order to collect the string of the bales 32 it is necessary to manually and/or mechanically remove the string prior to dispensing the bales. This can be problematic as the task can be time consuming and difficult, especially in cases where bales are wet and the string is hard to remove.

Referring to FIG. 2, a bale string removal device 35 is shown. The bale string removal device 35 is in the form of a continuous rope 36 connected to the arm 17 of the pusher 18 or a front end of the body 12. The rope 36 is arranged to extend along the top of each of the bales 32 positioned in the chute 14 for feeding.

Figure 7:
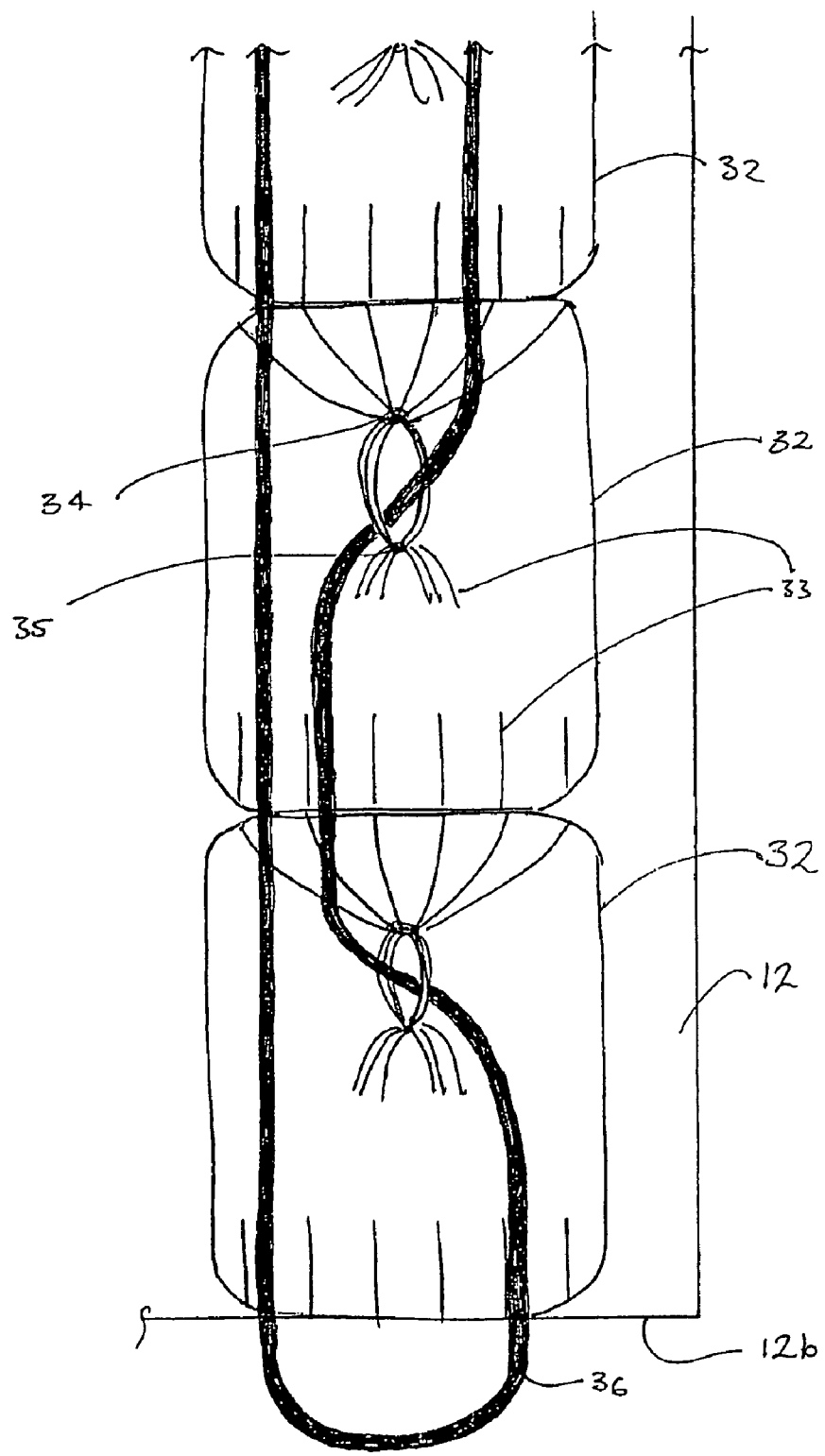
FIG. 7 is a top view of the bate string removal means in operational position in accordance with an embodiment of the present invention.

As is shown in more detail in FIG. 7, prior to commencement of feeding, the string 33 on each of the bales 32 is cut and the ends of the strings 33 are tied about a length of the rope 36. As is shown, each of strings 33 are gathered together by a first knot 34. The rope 36 is then placed over the first knot 43 and the strings 33 are then tied in a second knot 35. The rope 36 is captured between the knots 34 and 35 such that as the bales are dispensed from the end 12b of the body 12, the strings 33 are captured by the rope 36. It will be appreciated that a single operator can relatively easily perform this task as the string 33 does not need to be fully removed from the bale and the position of the rope is not fixed and can be easily positioned as desired.

As is apparent from FIG. 7, as the bales 32a are fed from the rear end 12b of the feeder 10, the string 31 is pulled away from the bales and remains with the rope 36. The bales 32a are then able to break-up as they are fed from the feeder, ensuring an evenly spread trail of food is provided behind the feeder. As the rope 36 moves with the arm 17 of the pusher 18, it is able to trail behind the feeder 10 collecting the strings 31 as the bales 32 are dispensed therefrom.

Alternatively, in feeder that employs spreaders as in the embodiment of FIGS. 8 and 9, the rope 36 can be fixed to an end of the trailer or truck, adjacent the front end 12a of the body 12. This will ensure that the rope 36 is maintained a distance from the spreaders 42 and does not come into contact with the spreaders 42, which may result in damage to the feeder.

Figure 3:
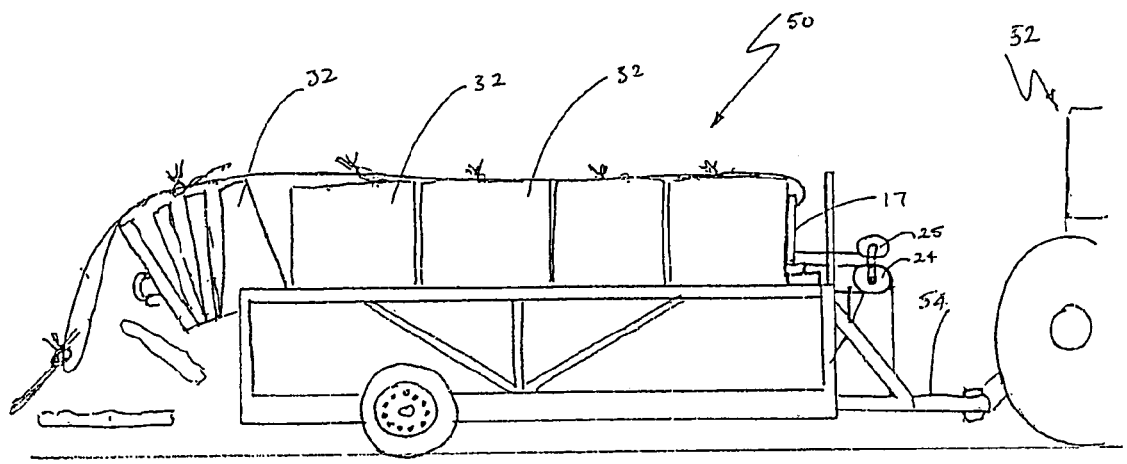
FIG. 3 is a side view of an alternative embodiment of the feeding device of the present invention provided on a trailer to be pulled by a vehicle.
Figure 4:
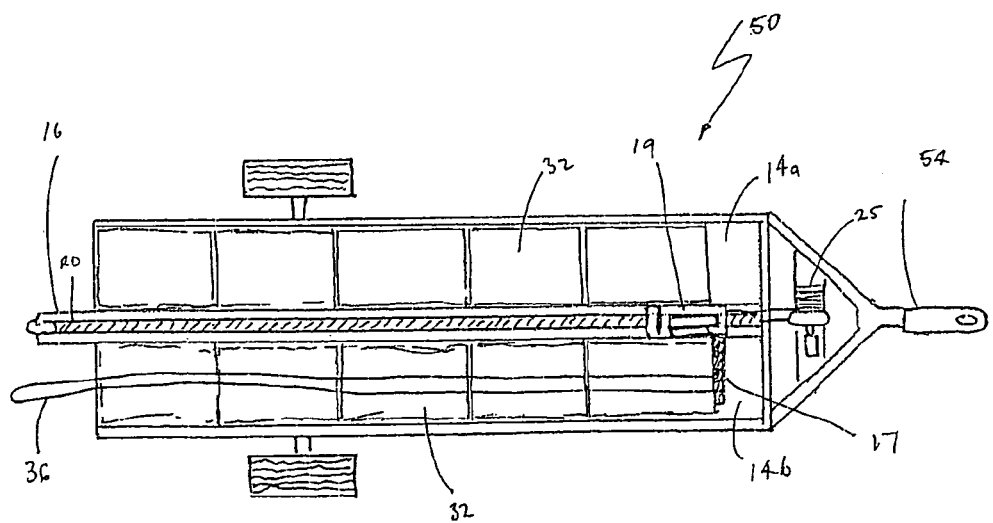
FIG. 4 is a top view of the feeding device of FIG. 3.

Referring to FIGS. 3 and 4, yet another embodiment of the feeding device of the present invention is shown. In this embodiment the feeder 10 is incorporated into a trailer 50 that is pulled across a field by a vehicle 52, such as a tractor. The trailer 50 has a is standard tongue 54 that facilitates connection of the trailer 50 to a hitch of the vehicle 52, in a manner that is well known in the art. The trailer 50 can be loaded with bales 32 for feeding in the manner as described above.

FIG. 4 shows the trailer 50 loaded with bales 32 in two chutes 14a and 14b. Arm 17 of the pusher 18 is orientated for dispensing bales 32 from chute 14b, and rope 36 is arranged to collect and remove the strings from the bales 32 in chute 14b, in the manner as described above.

As the trailer 50 is moved across a field, driving winch 24 is operated at a desired speed to move the pusher 18 towards the rear of the trailer 50. In one embodiment, the driving winch 24 is a hydraulic winch capable of winding up to 30 meters of cable 22. The hydraulic winch has a 4500-kilogram pulling load in both a forward and reverse direction and is controlled by a remote control device or other similar controller. It will be appreciated that the specifications of the winch may vary as required. Upon activation of the driving winch 24, the arm 17, positioned behind the frontmost bale 32, pushes the bales 32 in continuous line along the chute 14b such that the rearmost bale 32 is fed from the end of the trailer 50, as shown in FIG. 3. As each of the strings holding the bales together are connected to the rope 36 in the manner as described above, as the bales 32 are dispensed from the rear end 12b of the body 12, the bales 32 break up resulting in a continuous and even trail of bay/silage extending behind the trailer 50. The livestock is then presented with a long trail of food to access, which reduces bullying by more dominant animals. It will be appreciated that spreaders such as those shown in FIGS. 8 and 9 could also be employed to assist in more evenly distributing the bales 32 from the trailer 50.

Following the feeding of the bales from chute 14a, the driving winch 24 is turned off. In this regard, an automatic cut-off sensor or electronic switch may be provided at the rear end 12b of the body 12 to detect the position of the pusher 18 along the slide 16. Upon detection of the pusher 18 at the rear end 12b of the body, a signal is sent to a controller to cease operation of the driving winch 24. A signal may also be provided to the operator of the vehicle 52 informing them that the feeder has complete dispensing bales 32. The operator of the vehicle 52 may then stop the vehicle to reload the feeder.

Upon cessation of the driving winch 24, the return winch 25 is initiated to return the pusher 18 to a loading position, as shown in FIG. 4. As discussed above, in one embodiment, the return winch is a small hydraulic winch that is remotely activated by way of a remote control unit. An electronic switch or an automatic cut-off sensor may also be provided at the front end 12a of the body 12 to detect the position of the pusher 18 along the slide 16. When the pusher is detected to be in the loading position, a signal can be sent to the controller of the return winch to cease operation of the winch.

The operator may then rotate the arm 17 such that it is located behind the front bale 32 to dispense the bales loaded in the chute 14a. The vehicle 52 can then be restarted together with the driving winch 24, and upon detection of the pusher 18 reaching the endmost position, the cut-off sensor will inform the operator and cease operation of the driving winch 24 and initiate the return winch 25 to return the pusher 18 to the loading position. The operator will then be aware that the supply of bales 32 has exhausted and can return to reload the feeder or cease feeding out bales, as applicable.

In an alternate embodiment, such as that shown in FIG. 2, where the feeder is provided on the back of a tray truck 30, it is envisaged that the driving mechanism will have provided a sprocket which is adapted to drive/pull the chain/cable 22. The sprocket is preferably mounted onto the barrel of the driving winch to be hydraulically driven, which in turn, will drive the pusher 18 along the slider 16. In this alternate embodiment, the chain/cable 22 is preferably continuously fixed thus, there is no requirement for a return winch 25. Similarly, a split winch, such as that shown in FIGS. 8 and 9 could also be employed in the driving mechanism.

It will be appreciated that the feeder of the present invention feeds hay and silage from a vehicle in a continuous even trail to enable the feeding of large numbers of stock and allow them to have equal access to the material being fed out. It will also be appreciated that the feeder may alternatively be used to unload fully intact bales onto the ground which can then have individual hay frames placed over them for feeding smaller amounts of stock per frame. Such a device provides significant improvements in handling of bales of feedstock and provides an arrangement whereby a single operator can readily feed out multiple bales to livestock in a single run.

The feeding device of the present invention can also be readily employed on a variety of scales, from large trucks and flat bed vehicles, to smaller trailers and utility vehicles. This can enable a user to adapt the present invention to their specific needs, which may change over time.

It will be appreciated by persons skilled in the art that numerous variations and/or modifications may be made to the invention as shown in the specific embodiments without departing from the spirit or scope of the invention as broadly described. The present embodiments are, therefore, to be considered in all respects as illustrative and not is restrictive.

The claims defining the invention are as follows:

1. A feeding device for dispensing bales of feed material from a vehicle, the feeding device comprising:
   a body having a surface for receiving a plurality of the bales thereon, the surface having a first end and a second end and comprising a first chute and a second chute arranged substantially parallel to each other so as to extend longitudinally between the first end and the second end of the surface, each chute configured such that the plurality of bales are arranged to be received therein to form a first row and a second row of bales;
   a pusher slidably mounted to the surface and moveable between a first position proximal the first end of the surface and a second position proximal the second end of the surface;
   a driving mechanism controllable to move the pusher between the first and second positions; and
   a bale string removal member configured to extend adjacent the bales to facilitate connection of one or more strings of each bale thereto such that as the bales are progressively dispensed from the second end of the surface, the bale string removal member captures and removes the one or more strings provided to retain the feed material together;
   wherein movement of the pusher from the first position to the second position applies a pushing force to the bales arranged in either the first row or the second row such that the bales in that row are progressively dispensed from the second end of the surface.
   wherein the bale string removal member is a rope secured at one end to the body or the pusher and positioned to extend over each bale in the row of bales to be dispensed.

2. A feeding device according to claim 1, wherein the bale string removal member is a rope secured at one end to the pusher and positioned to extend over each bale in the row of bales to be dispensed.

3. A feeding device according to claim 1, wherein the body is mounted to the vehicle.

4. A feeding device according to claim 1, wherein the body is part of the vehicle.

5. A feeding device according to claim 1, wherein each chute has one or more skids formed on the surface of the body to control sliding movement of the bales within each chute.

6. A feeding device according to claim 1, wherein the pusher is mounted to the surface of the body between said first and second chutes.

7. A feeding device according to claim 6, wherein the pusher includes a pusher arm that extends laterally therefrom so as to extend across the first or second chute to apply said pushing force to said bales in the first or second chute to dispense said bales from the second end of the surface.

8. A feeding device according to claim 7, wherein the pusher arm is pivotally attached to the pusher such that it can be positioned to extend across either the first or second chute when the pusher is in said first position.

9. A feeding device according to claim 1, wherein the surface of the body comprises a slide that extends from the first end of the body to a distance beyond the second end of the body and the pusher is mounted to said slide.

10. A feeding device according to claim 9, wherein the slide includes a channel member upon which the pusher is slidably mounted.

11. A feeding device according to claim 1, wherein the driving mechanism comprises at least one winch mounted to the vehicle to move the pusher between the first and second positions.

12. A feeding device according to claim 11, wherein the at least one winch is attached to the pusher by one or more cables or chains such that operation of the winch winds one or more of the cables or chains onto the winch to impart motion to the pusher.

13. A feeding device according to claim 12, wherein the driving mechanism comprises a first winch which moves the pusher from the first position to a second position, and a second winch which moves the pusher from the second position to the first position.

14. A feeding device according to claim 1, wherein one or more spreaders are attached to a second end of the surface to assist in dispensing the bales from the second end of the surface.

15. A feeding device according to claim 14, wherein the one or more spreaders comprise one or more rotatable drums having one or more radial spikes extending therefrom which contact the material of the bales to assist in removing the material therefrom.

16. A feeding device according to claim 15, wherein the one or more rotatable drums are mounted to said body adjacent the second end thereof.

17. A feeding device for dispensing bales of feed material from a vehicle, the feeding device comprising:

a body having a surface for receiving a plurality of the bales thereon, the surface having a first end and a second end and being configured such that the plurality of bales are arranged in at least one row extending at least partially between the first and second ends;

a pusher slidably associated with the surface and moveable between a first position proximal the first end and a second position proximal the second end, wherein movement of the pusher from the first position to the second position applies a pushing force to the bales arranged in at least one row such that the bales in that row are progressively dispensed from the second end;

a driving mechanism controllable to move the pusher between the first and second positions; and a rope secured at one end to the body and positioned to extend over each bale in the row of bales extending adjacent the bales to facilitate connection of one or more strings of each bale thereto such that as the bales are progressively dispensed from the second end, the one or more strings are captured by the rope and removed from the bales.

18. A feeding device for dispensing bales of feed material from a vehicle, the feeding device comprising:

a body having a surface for receiving a plurality of the bales thereon, the surface having a first end and a second end and being configured such that the plurality of bales are arranged in at least one row extending at least partially between the first and second ends;

a pusher slidably associated with the surface and moveable between a first position proximal the first end and a second position proximal the second end, wherein movement of the pusher from the first position to the second position applies a pushing force to the bales arranged in at least one row such that the bales in that row are progressively dispensed from the second end;

a driving mechanism controllable to move the pusher between the first and second positions; and a rope secured at one end to the pusher and positioned to extend over each bale in the row of bales extending adjacent the bales to facilitate connection of one or more strings of each bale thereto such that as the bales are progressively dispensed from the second end, the one or more strings are captured by the rope and removed from the bales.

* * * * *